RING-COUNTER EMPLOYING PLURAL AND-GATES PER STAGE THAT SIMULTANEOUSLY CONNECT ASSOCIATED AND SUBSEQUENT STAGES TO AVOID SWITCHING DELAY

Filed April 10, 1964

6 Sheets-Sheet 1

INVENTOR
Wolfgang Hilberg
BY Spencer & Kaye
ATTORNEYS

Oct. 3, 1967 W. HILBERG 3,345,574
RING-COUNTER EMPLOYING PLURAL AND-GATES PER STAGE THAT SIMULTANEOUSLY CONNECT ASSOCIATED AND SUBSEQUENT STAGES TO AVOID SWITCHING DELAY
Filed April 10, 1964 6 Sheets-Sheet 2

INVENTOR
Wolfgang Hilberg
BY Spencer & Kaye
ATTORNEYS

Oct. 3, 1967 W. HILBERG 3,345,574

RING-COUNTER EMPLOYING PLURAL AND-GATES PER STAGE THAT SIMULTANEOUSLY CONNECT ASSOCIATED AND SUBSEQUENT STAGES TO AVOID SWITCHING DELAY

Filed April 10, 1964

6 Sheets-Sheet 3

INVENTOR
Wolfgang Hilberg
BY Spencer & Kaye
ATTORNEYS

Oct. 3, 1967 W. HILBERG 3,345,574

RING-COUNTER EMPLOYING PLURAL AND-GATES PER STAGE THAT SIMULTANEOUSLY CONNECT ASSOCIATED AND SUBSEQUENT STAGES TO AVOID SWITCHING DELAY

Filed April 10, 1964

6 Sheets-Sheet 4

INVENTOR
Wolfgang Hilberg

BY Spencer & Kaye

ATTORNEYS

Oct. 3, 1967 W. HILBERG 3,345,574
RING-COUNTER EMPLOYING PLURAL AND-GATES PER STAGE THAT
SIMULTANEOUSLY CONNECT ASSOCIATED AND SUBSEQUENT
STAGES TO AVOID SWITCHING DELAY
Filed April 10, 1964 6 Sheets-Sheet 5

INVENTOR
Wolfgang Hilberg
BY Spencer & Kaye
ATTORNEYS

Oct. 3, 1967 W. HILBERG 3,345,574
RING-COUNTER EMPLOYING PLURAL AND-GATES PER STAGE THAT
SIMULTANEOUSLY CONNECT ASSOCIATED AND SUBSEQUENT
STAGES TO AVOID SWITCHING DELAY
Filed April 10, 1964 6 Sheets-Sheet 6

INVENTOR
Wolfgang Hilberg

BY Spencer & Kaye
ATTORNEYS

United States Patent Office 3,345,574
Patented Oct. 3, 1967

3,345,574

RING-COUNTER EMPLOYING PLURAL AND-GATES PER STAGE THAT SIMULTANEOUSLY CONNECT ASSOCIATED AND SUBSEQUENT STAGES TO AVOID SWITCHING DELAY

Wolfgang Hilberg, Neu-Ulm (Danube), Germany, assignor to Telefunken Patentverwertungsgesellschaft m.b.H., Ulm (Danube), Germany Filed Apr. 10, 1964, Ser. No. 358,797
Claims priority, application Germany, Apr. 10, 1963, T 23,818
11 Claims. (Cl. 328—43)

The present invention relates generally to counter circuits, and, more particularly, to a counter circuit which is constructed of bistable elements each of which has two inputs and two complementary outputs.

Counting pulses are fed to each of these bistable elements at all of the inputs by means of at least one respective input gate circuit having a plurality of inputs and a single output. Each output of a bistable element is connected with one respective input of at least one respective input gate circuit pertaining to a bistable element which follows in the counting direction.

Counters constructed as mentioned above have proven themselves practical in many ways in their actual applications. During the course of development of circuits which are to operate at incrasingly higher counting frequencies, these counters at times are too slow, since the switching time of the bistable elements is each time incorporated anew into the total counting time because the capacity of each succeeding bistable element is determined only after the output potential of the preceding bistable element in the counting direction has been reached.

With this problem of the prior art in mind, it is a main object of the present invention to provide a circuit which eliminates the above-mentioned disadvantages.

Another object of the present invention is to provide a device of the character described which permits substantially higher counting rates than the previous devices used in this art.

These objects and others ancillary thereto are accomplished in accordance with preferred embodiments of the invention wherein a plurality of bistable elements have inputs and outputs. Input gate circuits are connected in front of the inputs of the bistable elements in the form of AND-circuits. The outputs of these AND-circuits are respectively connected with an input of the bistable element pertaining thereto as well as with an input of at least one AND-circuit pertaining to the subsequent bistable element in the counting direction.

In this manner, the state of readiness for operation of each AND-circuit is already effected by the output signal of an AND-circuit of the preceding bistable element and there need be no waiting until the output potential of this bistable element has been reached. Thus, the effectiveness of the present invention can be generally summarized as an undelayed bridging or connecting between input and output of the bistable elements for the signals placing the elements into a condition of readiness for operation. The response time of the bistable elements is then no longer incorporated into the counting speed, that is, it does not add time to the counting speed.

Additional objects and advantages of the present invention will become apparent upon consideration of the following description when taken in conjunction with the accompanying drawings in which.

Figure 1:
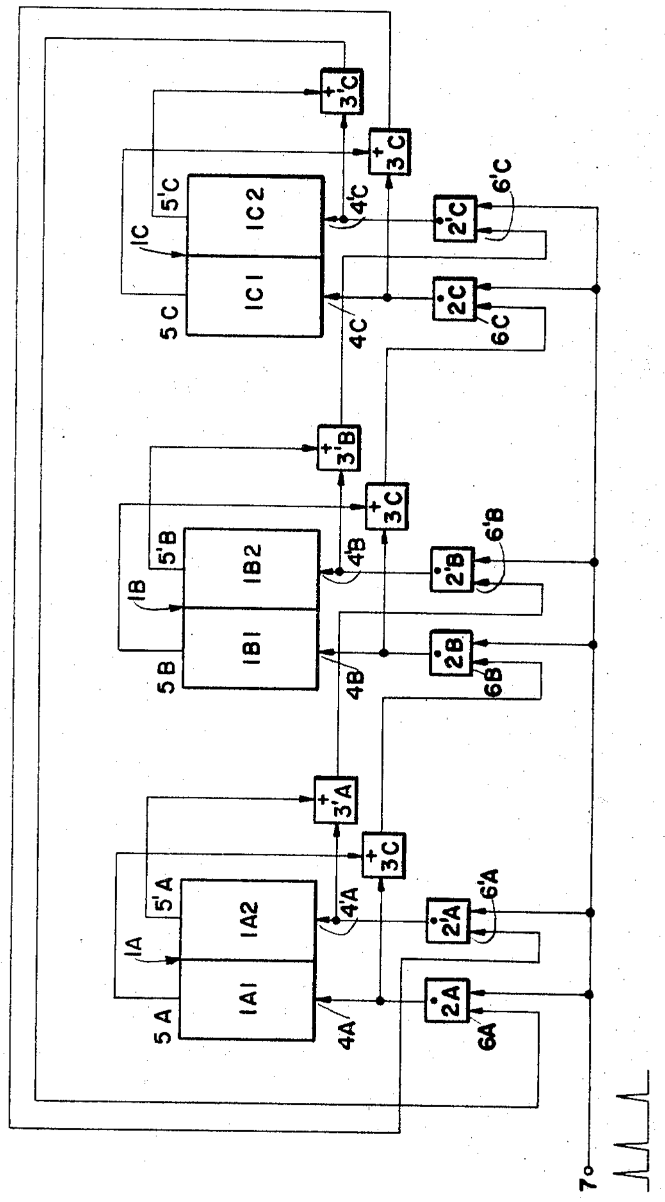
FIGURE 1 is a block diagram of a first embodiment of the present invention.

Before considering the drawings in detail, it should be noted that as a further feature of the counter of the present invention, two OR-circuits can be provided for each bistable element. These OR-circuits on one hand are disposed in the connection of each output of a bistable element with the input of the AND-circuits connected in front of the inputs of the succeeding elements, and on the other hand are provided in the connections of each output of the AND-circuits of the preceding elements with the inputs of the AND-circuits of the succeeding elements. This is done in such a manner that the inputs of the OR-circuit are connected with the outputs of the preceding elements or AND-circuits but with their outputs connected with the inputs of the succeeding AND-circuits. In this manner, it is ensured that the AND-circuits of the respectively succeeding elements are on the one hand already opened by the output pulse of the AND-circuit connected in front of the corresponding and/or interchanged or crossed input of the preceding bistable element, and that the AND-circuits are held in this open condition until the output potential at the output of the preceding bistable element assigned thereto has been set.

As another feature of the present invention, in order to increase the operating speed of the circuit, the outputs of all of the bistable elements can additionally be connected with one further respective input of an AND-circuit connected in front of an input of a preceding bistable element. In this way, it is assured in a safe manner that only one respective AND-circuit connected in front of the two inputs of each bistable element will be open without having to consider the inherent switching time of the bistable elements when designing the admissible counting frequency or rate. These elements have to provide the blocking potentials for the AND-circuit connected in front of the respective second input of the succeeding bistable element.

As another feature of the invention, it can be advantageous when constructing the circuit, particularly for operation at extremely high frequencies, to connect extension circuits after the outputs of all of the AND-circuits. These extension circuits lengthen the respective output pulse. This arrangement also contributes toward eliminating the influence of the inherent switching time of the bistable elements upon the admissible counting rate and furthermore provides the advantage that very rapid counters can be constructed even of relatively slowly operating bistable elements and they thus can be manufactured in a correspondingly inexpensive manner. Conversely, when using very rapid bistable elements, extremely rapidly operating counters can be obtained using only very few individual stages. The simplest example for such an extension or pulse lengthening circuit is an RC member.

A feature which is of special advantage is an arrangement in which the AND-circuits connected in front of the inputs of the bistable stages are constructed so that two transistors can be actuated separately from the outside and are connected together. They are so connected that the base of a transistor controlled on the emitter side is connected with the fixed potential common to the inputs and to the output of the AND-circuit via the emitter-collector path of a complementary transistor controlled on its base side. This construction is of particular advantage because these AND-circuits can operate in a particularly rapid manner and thus further increase the counting rate of the entire arrangement.

As a further feature of the invention, delay members can be used in the connections of the outputs of the AND-circuits of each stage to the inputs of the AND-circuits of the following stages. Such delay members compensate for the difference between the counting pulse duration and the response time of the AND-circuits. In this manner, even relatively broad counting pulses whose duration surpasses the response time of the AND-circuits can still be processed. The simplest example for such a delay member is a piece of a transmission line.

With more particular reference to the drawings, FIGURE 1 illustrates a counter constructed of three stages which are respectively, I or A, II or B, and III or C, and which are connected in a ring circuit in such a manner that in the case of two stages—and generally with N bistable stages, N–1 stages—the left input gate circuit is always controlled by a left output and the right input gate circuit is controlled by a right output. On the other hand, in one of the stages, the left input gate circuit is controlled by a right output and the right input gate circuit is controlled by a left output.

The salient structure of each of the individual stages A, B, and C, are the bistable elements 1A, 1B, and 1C, which are all built in an identical manner. These elements are constructed of two identical halves and the first includes 1A1 and 1A2, the second includes 1B1 and 1B2, and the third includes 1C1 and 1C2. The individual bistable elements can be regarded as flip-flops.

Bistable element 1A has inputs 4A and 4′A, bistable element 1B has inputs 4B and 4′B, and bistable element 1C has inputs 4C and 4′C. A plurality of AND-circuits are connected one in each of the bistable element inputs and these AND-circuits are 2A, 2′A, 2B, 2′B, 2C, 2′C. All of these AND-circuits have two inputs, and one respective input of each AND-circuit is connected in parallel with all of the other respective inputs of the AND-circuits and to an input terminal 7 by means of which the counting pulses are fed to the AND-circuits. The second respective input of the AND-circuits 6A, 6′A, 6B, 6′B, 6C, 6′C, are connected, respectively, with the output of the AND-circuit of the preceding stage in the manner of a ring circuit in such a manner that in two of the cases—and generally for a counter with N bistable stages, in N–1 cases—the input and/or output of the corresponding AND-circuits are connected together and in one case the input and output of the AND-circuits disposed in front of the crossed or interchanged inputs of the bistable elements pertaining thereto are connected together. In the present embodiment, the input interchange occurs in the transition from stage C to stage A.

A number of OR-circuits 3A, 3′A, 3B, 3′B, 3C, 3′C, are disposed in the lines connecting the inputs of the AND-circuits of one stage and respectively one input of the AND-circuit of the succeeding stage. The second input of these OR-circuits is connected with the bistable element ouputs 5A, 5′A, 5B, 5′B, 5C, 5′C, respectively of the half of the bistable element which pertains thereto. By means of the OR-circuits the output signals of the AND-circuits and of the bistable elements are superimposed for the input of the respectively corresponding AND-circuit of the succeeding counter stage.

In the operation of the circuit shown in FIGURE 1, it is first assumed that there is a momentary counter condition in which all of the right halves 1A2, 1B2, and 1C2, of the bistable stages A, B, and C, respectively, are at a positive potential. As a consequence of this the AND-circuits 2′B, 2′C, and 2A are in their open condition or in a state of readiness to allow a pulse at the other input of the AND-circuit to pass therethrough. If a positive counting pulse should now appear at terminal 7, and thus at the inputs of all six AND-circuits of all three stages, this pulse can effect a shift of the potential from the negative to the positive only at the left half 1A1 of the bistable stage 1A which is connected after the AND-circuit 2A, because the other two halves 1B2 and 1C2 of the bistable stages connected with the open AND-circuits 2′B and 2′C are already at a positive potential.

In order to simplify the following description, the switching of the left half 1A1, 1B1, or 1C1 of the bistable elements from a negative to a positive potential shall be considered a transition of the respective counter stage from condition O to condition L. Coupled with this shift of potential on the left half of each bistable element is the reverse shift in potential of its right half. Keeping the above-mentioned definitions in mind, the switching succession set forth in the first three columns of Table I results for the three bistable elements. The further six columns in this table designate the opening and blocking of the AND-circuits connected in front of the individual bistable elements wherein an L represents the symbol for a positive potential at the AND-circuit inputs 6A, 6′A, 6B, 6′B, 6C, 6′C, and thus represents an open AND-circuit, and an O represents the symbol for a negative input potential and thus a blocked AND-circuit.

TABLE I

| Bistable Elements | | | AND-Circuits | | | | | |
|---|---|---|---|---|---|---|---|---|
| 1A | 1B | 1C | 2A | 2′A | 2B | 2′B | 2C | 2′C |
| O | O | O | L | O | O | L | O | L |
| L | O | O | L | O | L | O | O | L |
| L | L | O | L | O | L | O | L | O |
| L | L | L | O | L | L | O | L | O |
| O | L | L | O | L | O | L | L | O |
| O | O | L | O | L | O | L | O | L |

From this table it can be seen that after the first bistable element 1A has been switched from condition O to condition L, by means of the first counting pulse, the second counting pulse appearing at terminal 7 finds the AND-circuits 2A, 2B, 2′C in open condition. However, this positive counting pulse can only effect a switching from O to L at the left half 1B1 of the bistable element 1B and this left half is connected with the AND-circuit 2B. The other halves of bistable elements connected with open gate circuits are already at L.

In the same manner that the output pulse of the AND-circuit 2A opened the AND-circuit 2B by applying a positive potential to its input 6B, and which output pulse from AND-circuit 2A was triggered by the first counting pulse, the output pulse of AND-circuit 2B which is triggered by the second counting pulse now opens the gate circuit 2C which is connected in front of the left half 1C1 of the bistable element 1C by applying a positive potential to its input 6C. The corresponding potential relationships of all of the bistable elements and of all of the AND-circuits can be seen from the third line of Table I.

In quite an analogous manner, further positive counting pulses which appear at terminal 7 continuously switch the bistable elements and the AND-circuits further in the succession illustrated on the subsequent lines of Table I. These further positive counting pulses only affect one half of a bistable element and this half on the one hand is connected with an open AND-circuit and on the other hand has a potential which can be varied by the counting pulse. Finally, after six counting pulses, the initial condition has again been established and the entire counting cycle can begin again.

The circuit illustrated in FIGURE 1 is constructed for operation with positive counting pulses. The AND-circuits are correspondingly constructed so that they have an output signal when a positive potential is present simultaneously at both of its inputs. However, the circuit in accordance with the present invention can also be used for negative counting pulses. In such a case there is only the requirement that the inputs of the AND-circuits which are directly connected with the input terminal 7 be constructed as negated inputs so that these AND-circuits each produce an output pulse when a positive input pulse is present at their respective inputs 6 and a negative input pulse is present at their respective second input. However, instead of this construction it is also prossible to provide an arrangement wherein both inputs of the AND-circuits respond to negative input signals and in this case it is only necessary to correspondingly arrange the conductivity type of the transistors of the bistable elements.

Figure 2:
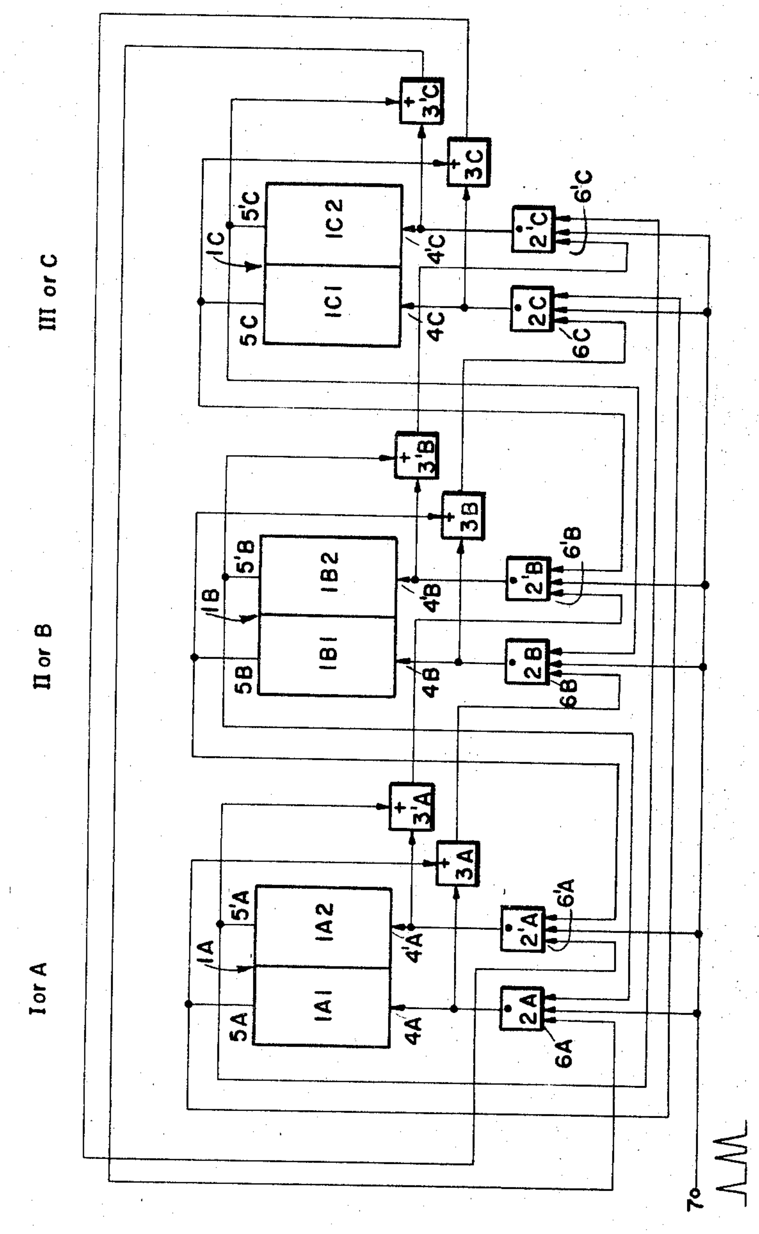
FIGURE 2 is a block diagram of a second embodiment of the present invention.

In FIGURE 2 there is a modification of the circuit shown in FIGURE 1 in which all of the AND-circuits 2A through 2′C are provided with an additional and third input which is connected with the respective output of the half of the bistable element of the preceding counter stage. In two cases, this half is interchanged and in one case the corresponding half of the bistable element of the preceding counter element is used. Thus, in the general case of N stages, in N–1 cases, there will be this interchange or crossed connection. The additional connection accelerates the blocking potential for the AND-circuit connected in front of the crossed input of the succeeding element. This blocking potential is provided from the second respective half of each bistable element. By no longer providing this blocking potential from each stage to the succeeding stage, but rather by circumventing all intermediate stages and passing it directly to the immediately preceding stage, this stage is safety blocked at the time an input counting pulse intended for it appears even if this third input of each AND-stage responds only slowly. In other words, this additional connection ensures that both AND-circuits which are connected in front of a bistable element are never open at the same time. In general this circuit arrangement has the effect that only two AND-circuits are open at all, while in the circuit illustrated in FIGURE 1 half of the AND-circuits are always open. This has the advantage that the need for counting pulse power is greatly decreased and thus a great number of stages can be activated or controlled together with relatively small input power.

The switching succession of the bistable elements and the AND-circuits pertaining thereto shown in FIGURE 2 can be seen from Table II wherein the same definitions for the symbols L and O set forth in connection with Table I are used.

TABLE II

| Bistable Elements | | | AND-Circuits | | | | | |
|---|---|---|---|---|---|---|---|---|
| 1A | 1B | 1C | 2A | 2′ A | 2B | 2′ B | 2C | 2′ C |
| O | O | O | L | O | O | O | O | L |
| L | O | O | L | O | L | O | O | O |
| L | L | O | O | O | L | O | L | O |
| L | L | L | O | L | O | O | L | O |
| O | L | L | O | L | O | L | O | O |
| O | O | L | O | O | O | L | O | L |

Figure 3:
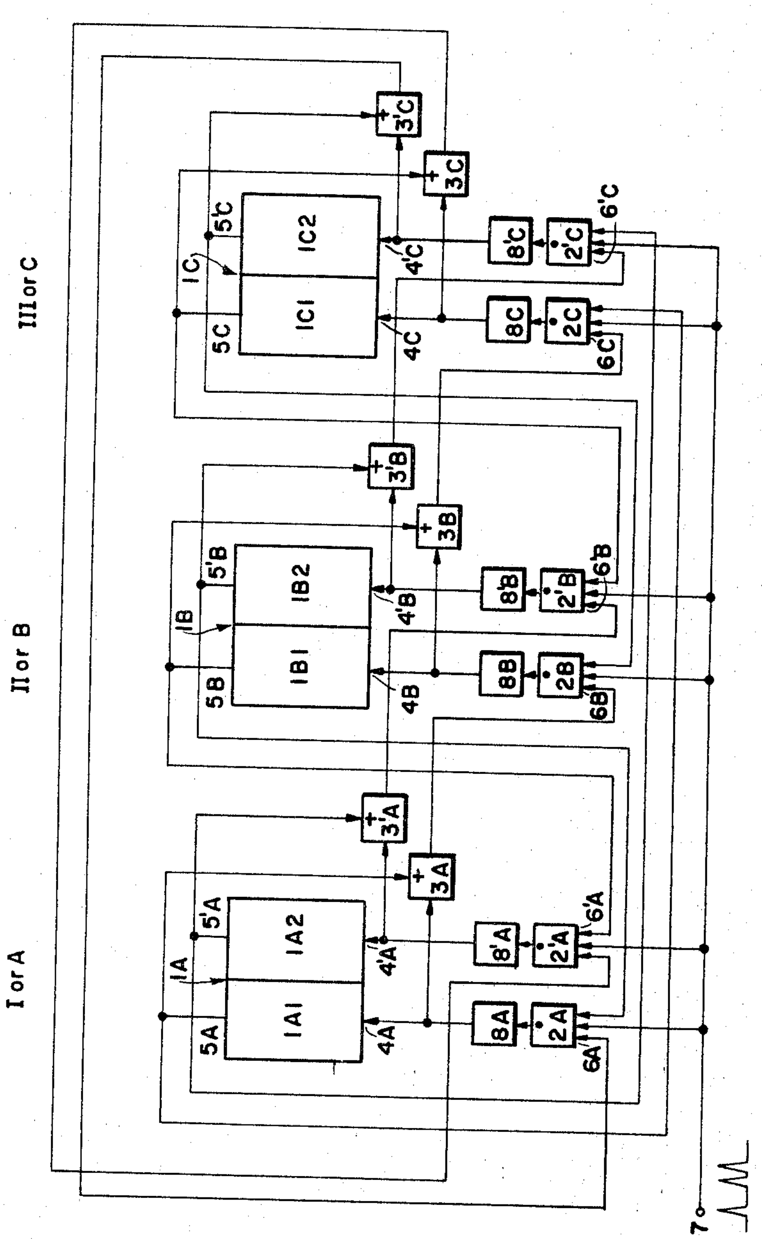
FIGURE 3 is a block diagram of a third embodiment of the present invention.
Figure 6:
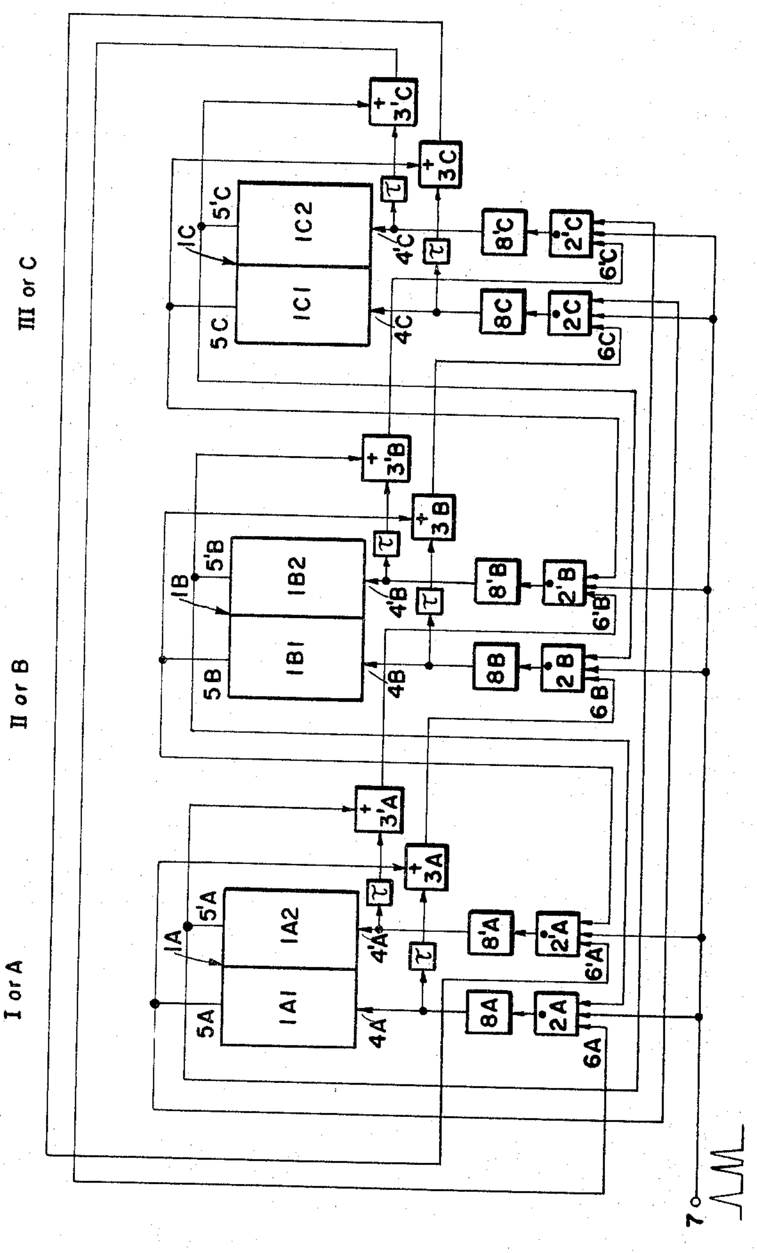
FIGURE 6 is a block diagram of a fourth embodiment of the present invention.

With more particular reference to FIGURE 3, a modification of the circuit of FIGURE 2 is shown wherein extension circuits 8A through 8′C are disposed in the connection of the AND-circuit outputs with the inputs of the bistable elements and the inputs of the AND-circuits of the succeeding stages. The purpose of these extension circuits is to extend the output pulse of each AND-circuit sufficiently that the positive potential which is produced by the output pulse is safely maintained at an input 6 of a succeeding AND-circuit until the output potential of the respective half of the bistable element is applied to this input of the succeeding AND-circuit which has the same polarity, and is so even with bistable elements having large inherent switching times. In this manner a very rapidly operating counter can be constructed even with relatively slow bistable elements, that is, elements operating having large inherent switching times. The size of the pulse extension through the extension circuits 8 is arranged so that the output pulse of the AND-circuit and the output potential of the bistable element half pertaining thereto, and which potential is superimposed via the corresponding OR-circuit, supplement each other to form a continuous even potential characteristic at the input 6 of the AND-circuit of the next successive element. In such a circuit it is thus only the inherent speed of the AND-circuits which has a bearing upon the counting speed so that it is possible to operate at very high counting frequencies or rates. The switching succession of the three-stage counting device shown in FIGURE 3 corresponds entirely to that of FIGURE 2 so that Table II is also applicable to the FIGURE 3 device. In FIGURE 6 there is a modification of the circuit shown in FIGURE 3, in which between the outputs of the AND-circuits and the inputs of the OR-circuits there are provided delay-members $\tau$. As they consist, by way of example, of a piece of transmission line only they are not especially shown in the other figures.

The mode of construction of the circuit of the present invention which is shown in the preceding figures in block diagram form in which separate components were used for the bistable stages, the AND-circuits, the OR-circuits and the extension circuits, represents the optimum if the only factor to be considered is a particularly increased counting frequency. For example, a circuit in accordance with the present invention constructed of the bistable elements and the AND-circuits which are known today, as shown in FIGURE 3, in which the pulse extension circuits are monostable circuits having tunnel diodes whose breakthrough time is very short, can be operated up to a counting frequency in the gigacycle range. However, if the requirements imposed upon the admissible counting frequency are not as high, then the technical expenditure necessary for constructing the circuit can be substantially diminished by using individual circuit elements to perform several functions.

Figure 4:
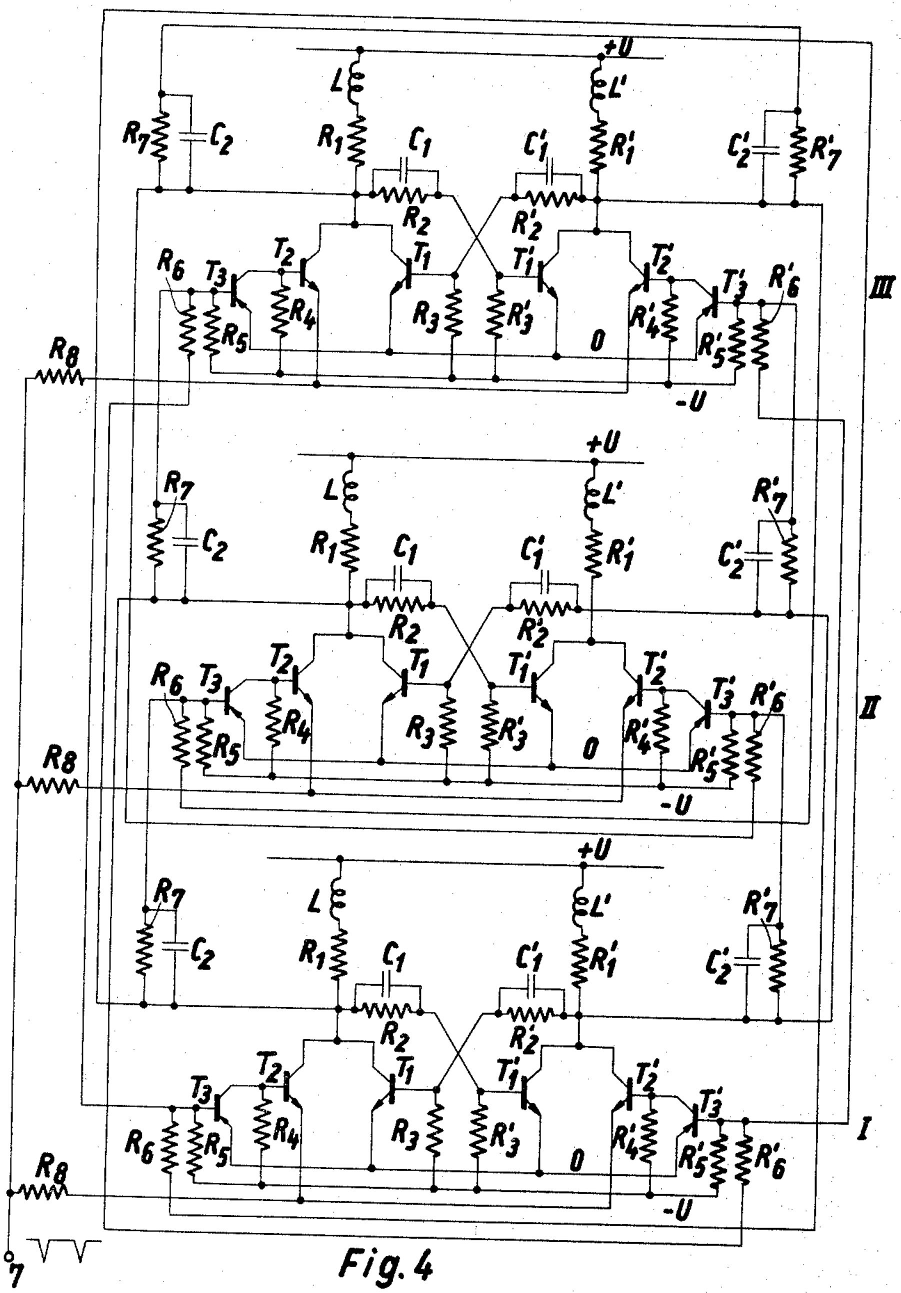
FIGURE 4 is a circuit diagram of an embodiment of a counter in accordance with the instant invention.

An example of such a three-stage circuit arrangement is shown in FIGURE 4 wherein the three counting stages are constructed in identical manner and have the same mode of operation.

The bistable elements 1A through 1C are each constructed of the transistors T1, T′1, the resistors R1, R′1, R2, R′2, R3, R′3, and the condensers C1 and C′1 which are connected together to a customary flip-flop of npn transistors. The left AND-circuits 2 of each bistable stage each includes the transistors T2 and T3 and the resistor R4. The right AND-circuits 2′ are each provided by the transistors T′2 and T′3 and the resistor R′4. The functions of the OR-circuits shown in FIGURES 1 through 3 and designated 3 and 3′ respectively are carried out in the arrangement of FIGURE 4 by portions of the bistable elements and the AND-circuits. That is, by the transistors T1 and T2 and T′1 and T′2, respectively, which perform the task of the OR-circuits in FIGURES 1 through 3 pertaining to the left and right half, respectively, of the counter stage.

The collector potentials of the transistors T1 and T2 and T′1 and T′2, respectively, are fed via voltage dividers formed by resistors R7 and R′7, respectively, of the first stage, and R5 and R′5, respectively, of the second stage, to the inputs of the AND-circuits of the succeeding stage, that is to the base of the transistors T3 and T′3 of this stage. The capacitors C2 and C′2 are used for increasing the switching speed. However, the voltage dividers may be replaced by other known means which are customarily used for changing a potential. For example, one respective Zener diode may be used in place of the RC-members R7, C2, and R′7, C′2, respectively. The bases of the transistors T3 and T′3 respectively of each counter stage are additionally connected via resistors R6 and R′6, respectively, to the collectors of the transistors T1 and T′1, respectively, that is, with the outputs of the bistable stage of the counter stage which is the respectively succeeding one. From these outputs the transistors receive their blocking potentials after this stage has been switched.

In the operation of the circuit of FIGURE 4, when a negative counting pulse from terminal 7 arrives via the resistor R8 at a conductive transistor T2 whose base has been placed at operating potential via the second transistor T3 of the AND-circuit, and when the transistor T1 of the left half of the bistable element is blocked the transistor T′1 of the right half is conductive, and this counting pulse triggers a corresponding collector current at the emitter of transistor T2. Then, the potential at the connection point of the collectors of the transistors T1 and T2 becomes negative so that the bistable element starts to switch over and change its condition. After the switching operation the transistor T1 is conductive and the transistor T′1 is blocked. The output pulse of the AND-circuit present at the collector of transistor T2, upon which pulse the output potential of the bistable element is superimposed at the collector of transistor T1, passes via the voltage divider R5, R7 and the capacitor C2 to the input of the left AND-circuit of the succeeding stage and renders the transistor T3 of this stage conductive. In this manner the switching operation progresses continuously from stage to stage.

Figure 5:
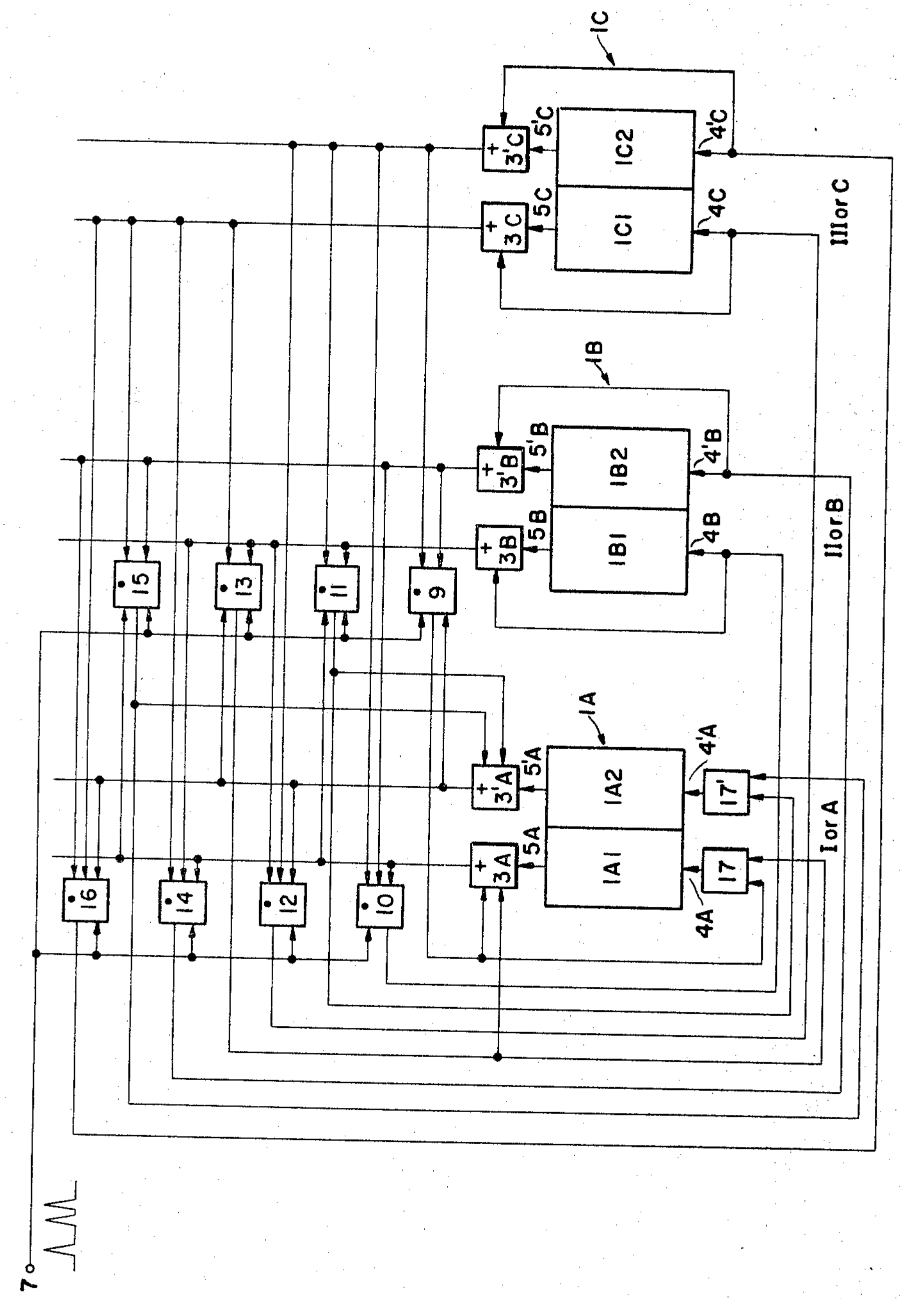
FIGURE 5 is a block diagram of a Gray-Code counter constructed in accordance with the principles of the present invention.

With more particular reference now to FIGURE 5, a counter is illustrated which operates in accordance with the Gray-Code and which is also constructed having three stages, the essential portion of which is formed by three bistable elements 1A, 1B and 1C. These bistable elements are in turn each constructed of identical halves 1A1 through 1C2. However, this counter is capable of counting from 1 to 8 because of a special type of counting code.

The AND-circuits 9 through 16 are assigned to the three bistable elements 1A to 1C in such arrangement that each AND-circuit at its various inputs is on the one hand connected with the counting frequency at terminal 7 and on the other hand with respectively one output of its bistable element half, while the output of each AND-circuit is connected with an input 4A through 4′C of the bistable element half. The OR-circuits 3A to 3′C which are connected after the outputs 5A to 5′C of the bistable elements 1A to 1C additionally provide for connecting one respective input of the AND-circuits 9 through 16 with one output of an AND-circuit pertaining to a counter stage which is the preceding one in the counting direction.

The switching succession of the bistable elements and the opening and blocking of the AND-circuits are set forth in Table III in which the same definitions of the symbols L and O as were used in Tables I and II are used again here.

TABLE III

| Bistable Elements | | | AND-Circuits | | | | | | | |
|---|---|---|---|---|---|---|---|---|---|---|
| 1A | 1B | 1C | 9 | 10 | 11 | 12 | 13 | 14 | 15 | 16 |
| O | O | O | L | O | O | O | O | O | O | O |
| L | O | O | O | L | O | O | O | O | O | O |
| L | L | O | O | O | L | O | O | O | O | O |
| O | L | O | O | O | O | L | O | O | O | O |
| O | L | L | O | O | O | O | L | O | O | O |
| L | L | L | O | O | O | O | O | L | O | O |
| L | O | L | O | O | O | O | O | O | L | O |
| O | O | L | O | O | O | O | O | O | O | L |

In this table it can be seen that each counting pulse always has only one opened AND-circuit 9 through 16 available so that only the bistable element which is connected to this AND-circuit can be switched further.

The OR-circuits 17 and 17′, respectively, which are connected in front of the inputs 4A and 4′A of the bistable stage 1A provide a connection of these counting inputs to the four AND-circuits 9 and 13, and 11 and 15, respectively. These are needed because in the first counter element two AND-circuit outputs are connected to each input while in the following counter elements only one AND-circuit output is connected with one input. In the general case of N bistable elements, the number of AND-circuit outputs to be connected with each element input would be correspondingly multiplied for all of the stages.

As in FIGURE 3, extension circuits 8 could additionally be used in the counter circuit of FIGURE 5. Such extension circuits would have to be connected respectively to the output of the AND-circuits 9 through 16. The purpose of these extension circuits is to broaden or extend the output pulse of the AND-circuits 9 through 16 sufficiently that the output potential coming from the outputs 5A to 5′C of the bistable elements 1A to 1C is connected with the AND-circuits to provide an even potential characteristic. These output pulses arrive directly at the OR-circuits through the connection line between the inputs 4A to 4′C of the bistable elements 1A to 1C and the OR-circuits 3A to 3′C. Likewise, delay members can be connected after the outputs of the OR-circuits 3A to 3′C, that is, into the connection of the AND-circuit outputs with the inputs of the AND-circuits pertaining to the counter elements following in the counter direction. These delay members then compensate for the possible difference between the duration of broader counting pulses and the response time of the AND-circuits.

It will be understood that the above description of the present invention is susceptible to various modifications, changes and adaptations, and the same are intended to be comprehended within the meaning and range of equivalents of the appended claims.

What is claimed is:

1. In a multistage counter of the type having a plurality of bistable elements each with two respective inputs which are all connected in parallel with one another, one input AND-circuit for each input having a plurality of inputs and one output, all of said parallel inputs of the bistable elements being connected to receive the counting frequency, the bistable elements each having two complementary outputs which are connected respectively with one input of at least one input AND-circuit pertaining to a bistable element which follows in the counting direction, the improvement wherein the output of each AND-circuit of each counter stage is connected with the corresponding input of the bistable element pertaining thereto as well as with an input of a respective AND-circuit pertaining to a bistable element which follows in the counting direction.

2. A multistage counter, comprising, in combination:

(a) a plurality of bistable elements each having two inputs all of which are connected in parallel and arranged to be connected to the counting frequency, and two complementary outputs; and (b) a plurality of input AND-gate circuits, one respectively disposed in each bistable element input, said AND-circuits having a plurality of inputs and one output, the complementary outputs of the bistable elements being connected respectively with one input of one input gate circuit pertaining to a bistable element following in the counting direction, the output of each AND-circuit of each counter stage being connected with a respective input of the bistable element pertaining thereto and with an input of a respective AND-circuit pertaining to a bistable element which follows in the counting direction.

3. A counter as defined in claim 2 comprising extension circuits each connected to an output of each AND-circuit for extending the output pulse of these AND-circuits.

4. A counter as defined in claim 2 comprising a plurality of delay members each disposed in the connection of an AND-circuit output of each element with the AND-circuit input of the element succeeding in the counting direction for compensating for the difference between the counting pulse duration and the response time of the AND-circuits.

5. A multistage counter, comprising, in combination:

(a) a plurality of bistable elements each having two inputs all of which are connected in parallel and arranged to be connected to the counting frequency, and two complementary outputs;

(b) a plurality of input AND-gate circuits, one respectively disposed in each bistable element input, said AND-circuits having a plurality of inputs and one output, the complementary outputs of the bistable elements being connected respectively with one input of at least one input gate circuit pertaining to a bistable element following in the counting direction, the output of each AND-circuit being connected with a respective input of the bistable element pertaining thereto and with an input of at least one respective AND-circuit pertaining to a bistable element which follows in the counting direction; and (c) two Or-circuits for each bistable element each disposed in the connection of a bistable element output with the input of the AND-circuit connected in front of the input of the succeeding element and also disposed in the connection of each output of the AND-circuit of the preceding stage with the input of the AND-circuit of the succeeding stage so that the inputs of the OR-circuits are connected with the outputs of the preceding elements and AND-circuits respectively but such that the outputs of these OR-circuits are connected with the inputs of the succeeding AND-circuits.

6. A multistage counter, comprising, in combination:

(a) a plurality of bistable elements each having two inputs all of which are connected in parallel and arranged to be connected to the counting frequency, and two complementary outputs; and (b) a plurality of input AND-gate circuits, one respectively disposed in each bistable element input, said AND-circuits having a plurality of inputs and one output, the complementary outputs of the bistable elements being connected respectively with one input of at least one input gate circuit pertaining to a bistable element following in the counting direction, the output of each AND-circuit being connected with a respective input of the bistable element pertaining thereto and with an input of at least one respective AND-circuit pertaining to a bistable element which follows in the counting direction, the outputs of all of the bistable elements being additionally connected with respectively one further input of an AND-circuit connected in front of an input of a bistable element preceding in the counting direction.

7. A multistage counter, comprising, in combination:

(a) a plurality of bistable elements each having two inputs all of which are connected in parallel and arranged to be connected to the counting frequency, and two complementary outputs; and (b) a plurality of input AND-gate circuits, one respectively disposed in each bistable element input, said AND-circuits having a plurality of inputs and one output, the complementary outputs of all of the bistable elements but the last one being connected, respectively, with one input of at least one input gate circuit pertaining to the corresponding input of a bistable element following in the counting direction, the output of each of the AND-circuits being connected with a respective input of the bistable element pertaining thereto and the output of each AND-circuit but the two AND-circuits of the last bistable element being connected with an input of at least one respective AND-circuit pertaining to the corresponding input of a bistable element which follows in the counting direction.

8. A multistage counter, comprising, in combination:

(a) a plurality of bistable elements each having a left and a right input and a left and a right output with the outputs being complementary;

(b) a plurality of OR-circuits and at least two for each bistable element, each OR-circuit having at least two inputs and one output and having one respective input connected to a respective bistable element input and another respective input connected to a respective output pertaining to the bistable element input to which the other OR-circuit input is connected; and (c) a plurality of AND-circuits and at least two for each bistable element, each AND-circuit having at least two inputs and one output and having its output connected to a respective bistable element input, one respective input of each AND-circuit being connected to receive counting pulses whereby said inputs are connected in parallel, and another respective input of each AND-circuit being connected with a respective OR-circuit output of a preceding bistable element considered in the counting direction, each respective OR-circuit output being, in all cases but the last one, connected to a corresponding bistable element input.

9. A counter as defined in claim 8 wherein each AND-circuit has a further input which, in all cases but one, is connected to the non-corresponding output of a subsequent bistable element cinsidered in the counting direction.

10. A counter as defined in claim 8 wherein the exceptional connections between AND-circuit inputs and OR-circuit outputs and AND-circuits inputs and bistable element outputs occur at the same bistable element.

11.A counter as defined in claim 8 wherein there are at least eight AND-circuits each having a number of inputs equal to the number of bistable elements plus one.

References Cited

UNITED STATES PATENTS

| | | | |
|---|---|---|---|
| 2,971,157 | 2/1961 | Harper | 328—42 |
| 3,084,286 | 4/1963 | Leo | 328—42 |

OTHER REFERENCES

Richards: Arithmetic Operations in Digital Computers Text (1955), D. Van Nostrand Co., pp. 195–196.

IRE Proceedings, October 1953, pp. 1313–1320.

ARTHUR GAUSS, *Primary Examiner.*

J. S. HEYMAN, *Assistant Examiner.*